United States Patent [19]
Cerea

[11] Patent Number: 6,048,960
[45] Date of Patent: Apr. 11, 2000

[54] METHOD OF PRODUCING SYNTHETIC ELASTOMERS AND ELASTOMERIC MIXTURES

[75] Inventor: Giuseppina Cerea, Milan, Italy

[73] Assignee: Geoline S.r.l., Milan, Italy

[21] Appl. No.: 08/974,470

[22] Filed: Nov. 20, 1997

Related U.S. Application Data

[63] Continuation of application No. 08/797,197, Feb. 11, 1997, abandoned.

[51] Int. Cl.$^7$ ........................................... C08J 3/12
[52] U.S. Cl. ............................... 528/483; 528/501
[58] Field of Search ..................... 528/483, 501

[56] References Cited

U.S. PATENT DOCUMENTS

| | | | |
|---|---|---|---|
| 3,677,321 | 7/1972 | Felstead | 528/483 |
| 3,799,235 | 3/1974 | Moosavian | 528/501 |
| 3,860,539 | 1/1975 | Miyazato | 260/4 |
| 3,932,370 | 1/1976 | Landi | 260/83.3 |
| 4,374,941 | 2/1983 | Sandstrom | 523/206 |
| 4,375,497 | 3/1983 | Sandstrom | 428/407 |
| 4,383,108 | 5/1983 | Jorgensen | 528/485 |
| 4,508,592 | 4/1985 | Kowalski | 528/501 |
| 5,334,658 | 8/1994 | Blumenstein | 525/71 |
| 5,591,794 | 1/1997 | Fukumoto | 524/447 |

*Primary Examiner*—Paul R. Michl
*Attorney, Agent, or Firm*—Finnegan, Henderson, Farabow, Garrett & Dunner, L.L.P.

[57] ABSTRACT

A method of producing elastomers or elastomeric mixtures, in which independent flows of $N_2$, of a solution of elastomers in organic solvents and, possibly, of forming and nucleation additives, are processed mechanically and thermally in a turbo-drier so as to produce elastomers or elastomeric mixtures, respectively, in solvent-free, granulated form.

18 Claims, 1 Drawing Sheet

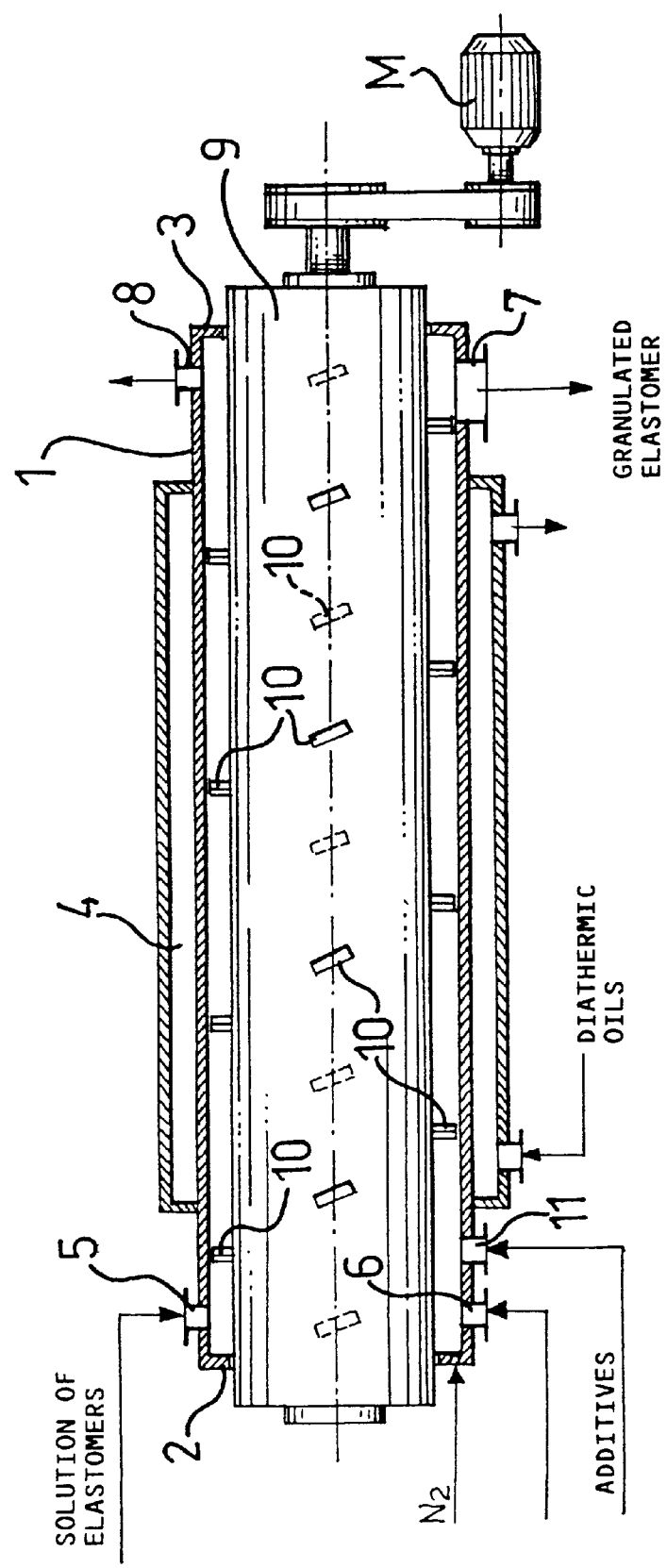

6,048,960

METHOD OF PRODUCING SYNTHETIC ELASTOMERS AND ELASTOMERIC MIXTURES

This is a continuation of application Ser. No. 08/797,197, filed Feb. 11, 1997, now abandoned.

TECHNICAL FIELD

The present invention relates in general to the production of synthetic rubbers and, more particularly, to a method of producing synthetic elastomers and elastomeric mixtures.

BACKGROUND OF THE INVENTION

It is known that synthetic elastomers such as, for example, polybutadiene rubber, polyisoprene rubber, butyl rubber, and styrene-diene rubber, etc., are produced by the catalyzed polymerization of the respective monomers in aromatic or aliphatic organic solvents.

According to known techniques, once the required degree of conversion has been reached, the polymerization reaction is stopped and the solvent is removed from the final solution.

The solvent is generally removed by distillation in a current of steam, producing an elastomer substantially free from organic solvent but containing up to 50–60% water.

In order to eliminate the water from the elastomer, drying is carried out by means of belt dryers which reduce the water content of the elastomer to a value of about 5–10%.

To eliminate the residual water content, the aforementioned drying treatment on belt dryers has to be followed by an extrusion step in suitable extruders which output a substantially anhydrous granulate. The water is eliminated during the extrusion step by virtue of the overheating which occurs because of the friction to which the elastomer is subjected.

The known technique thus produces a solvent- and moisture-free elastomer from the polymerization reaction solution by a method involving three separate steps: distillation in a current of steam, drying and extrusion.

Each of the three steps mentioned above involves the use of apparatus which is generally quite bulky and of considerably complex construction, leading to very high installation and running costs.

Moreover, although the aforementioned extrusion step is effective in eliminating the residual moisture from the elastomer, it appreciably worsens its resilience properties as a result of the considerable mechanical stress to which it is subjected.

SUMMARY OF THE INVENTION

The problem upon which the present invention is based is that of providing a method of producing synthetic elastomers which avoids the problems mentioned above with reference to the methods of the prior art.

This problem is solved, according to the invention, by a method of producing synthetic elastomers, comprising the polymerization of monomers suitable for the preparation of elastomers in one or more organic solvents, with the formation of a solution of the elastomers in the one or more organic solvents, and the subsequent removal of the one or more solvents, characterized in that the removal comprises the steps of:

supplying continuous equidirectional flows of the solution and of nitrogen heated to a temperature of from 120–140° C. into a turbo-drier comprising a tubular, cylindrical body with a horizontal axis, closed at its opposite ends and having openings for the admission of the aforesaid flows, a heating jacket for bringing the internal wall of the tubular body to a temperature of between 80 and 120° C., and a bladed rotor supported for rotation in the tubular, cylindrical body, processing the solution mechanically by means of the blades of the rotor which is rotated at a speed of from 600–1200 revolutions/minute, so as to create a thin, tubular and dynamic layer in which the solution is dispersed in very small droplets which are kept in a state of great turbulence, advancing the thin, tubular, dynamic layer towards the discharge opening of the turbo-drier, causing it to flow substantially in contact with the internal wall thereof, bringing about complete removal of the organic solvent and the formation of a final product in granulated form, by virtue of the intimate exchange of heat with the heated wall of the turbo-drier and with the hot nitrogen.

Preferably, the aforementioned organic solvents have boiling points of between 40 and 110° C. and are present in a ratio of from 1.0–1.2 by weight, relative to the elastomers.

Advantageously, the organic solvent removed from the turbo-drier through a suitable discharge opening can be recovered by condensation and reused for carrying out the polymerization reaction in a subsequent operating cycle.

The granulated elastomer discharged from the turbo-drier has a temperature of about 30–40° C.

The advantages connected with the use of the method according to the invention in comparison with the methods of the prior art are clear: first of all, the process as a whole is considerably simplified since a result (that is, the production of solvent-free elastomers) which, with known methods, was achieved with three successive steps is achieved in a single step. Moreover, the method according to the invention is implemented with extremely compact and versatile apparatus the installation and running costs of which are considerably lower than those of the apparatus of the prior art.

Finally, by avoiding the final extrusion step mentioned above with reference to the prior art, the method according to the invention produces elastomers with better resilience properties since the alterations of the polymeric structure which occur in this step are avoided.

The granulated elastomer produced by the method according to the invention is intended to be sent to subsequent conventional forming and vulcanization steps, after the addition of suitable additives.

In this connection, according to the methods of the prior art, the crude elastomers produced by the removal of the solvent from the polymerization reaction solution are subjected to successive conventional mechanical processing steps known as breaking, homogenization and "mastication", the purpose of which is to bring these elastomers to a degree of plasticity sufficient to enable them to be mixed with the additives typically used to prepare elastomeric forming and vulcanization mixtures. Amongst the additives most commonly used, plasticizers, vulcanizing agents, accelerators, peptizing agents, antioxidants, extending oils and colouring fillers may be mentioned.

The steps mentioned above are carried out in suitable apparatus such as cylindrical or closed extrusion plasticizers and mixers and the additives are added to the mixers only after prolonged mechanical processing of the crude elastomer and according to a very precise order of addition since this is critical for the purposes of the final result.

In this case, the methods of the prior art also have disadvantages connected with the use of apparatus of considerable bulk and complexity of construction, involving high installation and running costs.

Surprisingly, it has been found that, if a flow of the additives mentioned above is supplied to the turbo-drier simultaneously with the flows of elastomer solution and hot nitrogen, it is possible to prepare elastomeric mixtures already ready for sending to forming and vulcanization steps, overcoming all of the problems of the prior art.

The present invention consequently also relates to a method of preparing elastomeric mixtures, characterized in that it comprises the steps of:

supplying continuous equidirectional flows of a solution of elastomers in one or more organic solvents, of one or more additives selected from the group comprising plasticizers, vulcanizing agents, peptizing agents, accelerators, colourings, antioxidants, and extending oils, and of nitrogen heated to a temperature of from 120–140° C., respectively, into the turbo-drier, in which the wall temperature is between 80 and 120° C., processing the solution mechanically and mixing it with the one or more additives by means of the blades of the rotor which is rotated at a speed of 600–1200 revolutions/minute, so as to create a thin, tubular and dynamic layer in which the mixture of the solution and of the one or more additives is dispersed in very small particles which are kept in a state of great turbulence, advancing the thin, tubular and dynamic layer towards the outlet opening of the turbo-drier, causing it to flow substantially in contact with the internal wall thereof, bringing about complete removal of the organic solvent, by virtue of the intimate exchange of heat with the heated wall of the turbo-drier and with the hot nitrogen, and the formation of a perfectly homogeneous final product in granulated form, by virtue of the intense mechanical action of the bladed rotor.

Preferably, the aforementioned organic solvents have boiling points of between 40 and 110° C. and are present in a ratio of from 1.0–1.2 by weight, relative to the elastomers.

The use of the method described above achieves a considerable reduction in production costs since the number of steps necessary to produce a mixture ready for forming and vulcanization from a raw elastomer is reduced to only one. Moreover, the installation and running costs are clearly lower in comparison with methods of the prior art, by virtue of the considerable compactness and versatility of the apparatus used.

Finally, the effective mechanical processing achieved by means of the bladed rotor rotating at high speed achieves homogeneous mixing of the additives with the crude elastomer in considerably shorter times than those which were necessary with the known methods, and with the use of smaller quantities of additives, particularly peptizing agents which, in the methods of the prior art, necessarily had to be used in considerable quantities to facilitate the mastication step and the subsequent incorporation of the other additives.

Finally, it is worth pointing out that the quantities of antioxidants used in the method according to the invention are considerably lower than those used in the methods of the prior art by virtue of the fact that the nitrogen atmosphere in which the entire operation is carried out itself hinders the formation of peroxide bridges and consequently the initiation of oxidative reactions.

BRIEF DESCRIPTION OF THE DRAWING

The advantages and the characteristics of the invention will become clearer from the following description of some examples of the implementation of the method of producing synthetic elastomers given below with reference to apparatus shown schematically in the single appended drawing, provided purely by way of example.

DETAILED DESCRIPTION OF THE INVENTION

With reference to the drawing, apparatus used for the method of producing synthetic elastomers according to the invention comprises a turbo-drier constituted essentially by a tubular, cylindrical body 1, closed at its opposite ends by bases 2, 3 and having a coaxial heating jacket 4 through which a fluid, for example diathermic oil, is intended to flow to keep the internal wall of the body 1 at a predetermined temperature.

The tubular body 1 has openings 5, 6 for the admission of a solution of elastomers in organic solvents and of hot nitrogen, respectively, as well as openings 7 and 8 for the discharge of the granulated elastomers and of the organic solvents in the vapour state and the nitrogen, respectively.

A bladed rotor 9 is supported for rotation in the tubular body 1, its blades 10 being arranged helically and oriented for the centrifuging and simultaneous transportation towards the outlet, of the solution and of the final granulate, respectively.

A motor M is provided for driving the bladed rotor at speeds variable from 600 to 1200 revolutions/minute.

EXAMPLE 1

A flow of butadiene-styrene copolymer solution in cyclohexane, containing the copolymer in a ratio of 1:1 by weight relative to the cyclohexane was supplied continuously, with a flow-rate of 150 l/h, into the turbo-drier 1 in which the bladed rotor was rotated at a speed of 1000 revolutions/minute and in which the internal wall was kept at a controlled temperature of about 120° C. At the same time, an equidirectional flow of nitrogen heated to 140° C. was supplied through the opening 6 with a flow-rate of 300 $Nm^3/h$.

At the input of the turbo-drier 1, the flow of copolymer solution was immediately divided mechanically into minute droplets which were immediately centrifuged against the internal wall of the turbo-drier where, as a result of the exchange of heat with the wall and with the hot nitrogen, the cyclohexane was progressively removed and a thin, tubular and dynamic layer was formed, moving towards the outlet opening 7.

After a time of about 60" spent in the turbo-drier, a granulate constituted by the butadiene-styrene copolymer substantially free of cyclohexane and having a temperature of 35–37° C. was discharged continuously from the opening 7.

EXAMPLE 2

With the use of the apparatus shown schematically and described above and according to the method of the invention, a solution of polyisoprene in n-hexane, containing polyisoprene in a ratio of 1.2 by weight relative to the n-hexane, was supplied continuously, with a flow-rate of 130 kg/h, into the turbo-drier 1, through the inlet opening 5.

At the same time, a flow of nitrogen having a temperature of 120° C. and a flow-rate of 250 $Nm^3/h$ was supplied continuously through the opening 6.

The controlled wall temperature was about 100° C. and the speed of the bladed rotor was kept constantly at 800 revolutions/minute.

After an average time of about 60" spent in the turbo-drier, a granulate constituted by polyisoprene substantially free of hexane and having a temperature of 32–33° C. was discharged through the opening 7.

EXAMPLE 3

With the use of the apparatus described above with an additional, third inlet opening 11, a flow of a solution of butadiene-styrene copolymer in cyclohexane containing the copolymer in a ratio of 1:1 by weight relative to the cyclohexane was supplied into the turbo-drier 1 through the opening 5 with a flow-rate of 150 l/h.

At the same time, an equidirectional flow of nitrogen heated to 120° C. was supplied through the opening 6 with a flow-rate of 300 Nm³/h, and a continuous equidirectional flow constituted by the following additives in percentages weight/weight: 0.67% of benzothiazyl-2-cyclohexylsulphenamide, 0.33% of tetramethylthiuram disulphide, 2.5% of sulphur, 0.9% of paraffin wax, 67.1% of carbon black, 6.7% of zinc oxide, 16.8% of highly aromatic mineral oil, 5.0% of stearic acid was supplied through the opening 11 with a flow rate of 85 kg/h.

The controlled wall temperature was about 80° C. and the speed of the bladed rotor was kept constantly at 1000 revolutions/minute.

At the input of the turbo-drier 1, the flows of copolymer solution and of additives where immediately divided mechanically into extremely small particles which were centrifuged against the internal wall of the turbo-drier forming a thin, tubular and dynamic layer in which the removal of the solvent by virtue of the exchange of heat with the hot wall and with the nitrogen, and the intimate mixing between the copolymer and the additives took place simultaneously.

After a time of about 60" spent in the turbo-drier, a granulate constituted by an elastomeric mixture based on butadiene-styrene copolymer, free of solvent and ready for use in subsequent forming and vulcanization steps was discharged continuously from the opening 7. The temperature of the granulate was 35° C.

I claim:

1. A method of producing synthetic elastomers, comprising the polymerization of suitable monomers in one or more organic solvents with the formation of a solution of elastomers in the one or more organic solvents and the subsequent removal of the one or more solvents, wherein the removal comprises the steps of:

supplying continuous equidirectional flows of the solution of elastomers and of nitrogen heated to a temperature of from 120–140° C., respectively, into a turbo-drier comprising a tubular, cylindrical body with a horizontal axis, closed at its opposite ends and having openings for the admission of the aforesaid flows, a heating jacket for bringing the internal wall of the tubular body to a temperature of between 80 and 120° C., and a bladed rotor supported for rotation in the tubular, cylindrical body, processing the solution mechanically by means of the blades of the rotor which is rotated at a speed of from 600–1200 revolutions/minute, so as to create a thin, tubular and dynamic layer in which the solution is dispersed in extremely small droplets which are kept in a state of great turbulence, advancing the thin, tubular and dynamic layer towards the discharge opening of the turbo-drier, causing it to flow substantially in contact with the internal wall thereof, bringing about complete removal of the organic solvent and the formation of a final product in granulated form, by virtue of the intimate exchange of heat with the heated wall of the turbo-drier and with the hot nitrogen.

2. A method according to claim 1, wherein said organic solvents have a boiling point of between 40° C. and 110° C.

3. A method according to claim 2, wherein said organic solvents are contained in said solution of elastomers in a ratio of from 1.0–1.2 by weight, relative to the elastomers.

4. A method of producing elastomeric mixtures, comprising the polymerization of suitable monomers in one or more organic solvents with the formation of a solution of elastomers in the one or more organic solvents, which method comprises the further steps of:

supplying continuous equidirectional flows of the solution of elastomers, of one or more additives selected from the group comprising plasticizers, vulcanizing agents, peptizing agents, accelerators, colourings, antioxidants, extending oils, and of nitrogen heated to a temperature of from 120–140° C., respectively, into a turbo-drier comprising a tubular, cylindrical body with a horizontal axis, closed at its opposite ends and having openings for the admission of the aforesaid flows, a heating jacket for bringing the internal wall of the tubular body to a temperature of between 80 and 120° C., and a bladed rotor supported for rotation in the tubular, cylindrical body, in which the wall temperature is between 80 and 120° C., processing the solution mechanically and mixing it with the one or more additives by means of the blades of the rotor which is rotated at a speed of from 600–1200 revolutions/minute, so as to create a thin, tubular and dynamic layer, in which the mixture of the solution and of the one or more additives is dispersed in very small particles which are kept in a state of great turbulence, advancing the thin, tubular and dynamic layer towards the outlet opening of the turbo-drier, causing it to flow substantially in contact with the internal wall thereof, bringing about complete removal of the organic solvent by virtue of the intimate exchange of heat with the heated wall of the turbo-drier and with the hot nitrogen, and the formation of a perfectly homogeneous final product in granulated form, by virtue of the intense mechanical action of the bladed rotor.

5. A method according to claim 4, wherein said organic solvents have a boiling point of between 40° C. and 110° C.

6. A method according to claim 5, wherein said organic solvents are contained in said solution of elastomers in a ratio of from 1.0–1.2 by weight, relative to the elastomers.

7. The method according to claim 4, wherein the additives comprise: benzothiazyl-2-cyclohexylsulphenamide; tetramethylthiuram disulphide; sulphur; paraffin wax; carbon black; zinc oxide; highly aromatic mineral oil; and stearic acid.

8. The method according to claim 7, wherein the additives comprise, in percentages weight/weight: 0.67% of benzothiazyl-2-cyclohexylsulphenamide; 0.33% of tetramethylthiuram disulphide; 2.5% of sulphur; 0.9% of paraffin wax; 67.1% of carbon black; 6.7% of zinc oxide; 16.8% of highly aromatic mineral oil; and 5.0% of stearic acid.

9. A synthetic elastomer in granulated form, formed by:

flowing a butadiene-styrene copolymer solution in cyclohexane and an equidirectional flow of nitrogen at 140° C. into a turbo-drier having a rotor;

maintaining the copolymer solution in the turbo-drier for a time sufficient to remove the cyclohexane and granulate the copolymer; and discharging from the turbo drier the copolymer substantially free of cyclohexane;

wherein the copolymer solution containing the copolymer is in a weight ratio to the cyclohexane of 1:1, the rotor is rotated at 1000 RPM, and the internal wall of the turbo-drier is kept at approximately 120° C.

10. The synthetic elastomer in granulated form according to claim 9, wherein the flow rate of the copolymer solution is about 150 l/hr, and that of nitrogen is about 300 $Nm^3$/hr.

11. The synthetic elastomer according to claim 9, wherein the copolymer solution is processed by the rotor to form a layer flowing along an internal wall of the turbo dryer, the layer being heated by the internal wall.

12. A synthetic elastomer in granulated form, formed by:

flowing a polyisoprene solution in n-hexane and a flow of nitrogen at 120° C. into a turbo-drier having a rotor;

maintaining the copolymer solution in the turbo-drier for a time sufficient to remove the n-hexane and granulate the copolymer; and discharging from the turbo drier the copolymer substantially free of n-hexane;

wherein the copolymer solution containing the copolymer is in a weight ratio to the n-hexane of 1:2, the rotor is rotated at 800 RPM, and the internal wall of the turbo-drier is kept at approximately 100° C.

13. The synthetic elastomer in granulated form according to claim 12, wherein the flow rate of the copolymer solution is about 130 kg/hr, and that of nitrogen is about 250 $Nm^3$/hr.

14. The synthetic elastomer according to claim 12, wherein the copolymer solution is processed by the rotor to form a layer flowing along an internal wall of the turbo dryer, the layer being heated by the internal wall.

15. A synthetic elastomer mixture in granulated form, formed by:

flowing a solution of butadiene-styrene copolymer in cyclohexane, an equidirectional flow of nitrogen at 120° C., and a continuous equidirectional flow of additives into a turbo dryer having a rotor;

maintaining the copolymer solution and the flow of additives in the turbo drier for a time sufficient to mix the copolymer with the additives, to remove the cyclohexane, and to granulate the resulting copolymer mixed with the additives; and discharging from the turbo drier the copolymer mixed with the additives substantially free of cyclohexane;

wherein the copolymer solution containing the copolymer is in a weight ratio of 1:1 to the cyclohexane, the rotor is rotated at 1000 RPM, and the internal wall of the turbo drier is kept at approximately 80° C.

16. The synthetic elastomer mixture according to claim 15, wherein the flow rate of the copolymer solution is about 150 l/hr, the flow rate of the additives is about 85 kg/hr, and the flow rate of the nitrogen is about 300 $Nm^3$/hr.

17. The synthetic elastomer mixture according to claim 15, wherein the additives comprise, in percent weight/weight: 0.67% of benzothiazyl-2-cyclohexylsulphenamide; 0.33% of tetramethylthiuram disulphide; 2.5% of sulphur; 0.9% of paraffin wax; 67.1% of carbon black; 6.7% of zinc oxide; 16.8% of highly aromatic mineral oil; and 5.0% of stearic acid.

18. The synthetic elastomer mixture according to claim 15, wherein the copolymer solution and additives are processed by the rotor to form a layer flowing along an internal wall of the turbo dryer, the layer being heated by the internal wall.

* * * * *